US009538031B2

(12) United States Patent
Lee et al.

(10) Patent No.: US 9,538,031 B2
(45) Date of Patent: Jan. 3, 2017

(54) HINGE ASSEMBLY AND IMAGE FORMING APPARATUS HAVING THE SAME

(71) Applicant: Samsung Electronics Co., Ltd., Suwon-si (KR)

(72) Inventors: Jung-hoon Lee, Suwon-si (KR); Jung-ho Bang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 85 days.

(21) Appl. No.: 14/485,126

(22) Filed: Sep. 12, 2014

(65) Prior Publication Data
US 2015/0067986 A1  Mar. 12, 2015

Related U.S. Application Data

(60) Provisional application No. 61/876,982, filed on Sep. 12, 2013.

(30) Foreign Application Priority Data

Sep. 30, 2013 (KR) .................. 10-2013-0116509
Oct. 31, 2013 (KR) .................. 10-2013-0130972
Sep. 1, 2014 (KR) .................. 10-2014-0115326

(51) Int. Cl.
*H04N 1/00* (2006.01)
*E05D 7/00* (2006.01)
*E05F 1/12* (2006.01)

(52) U.S. Cl.
CPC ........ *H04N 1/00554* (2013.01); *E05D 7/0009* (2013.01); *E05F 1/1261* (2013.01);
(Continued)

(58) Field of Classification Search
CPC ............ H04N 1/00554; H04N 1/00519; H04N 2201/02495; H04N 2201/0094; E05F 1/1261; E05F 1/12; E05F 1/1215; E05F 1/1058; E05F 5/02; E05D 7/0009; E05D 11/02; E05Y 2201/638; E05Y 2900/608; Y10T 16/5386; Y10T 16/5373; Y10T 16/54021; Y10T 16/593; Y10T 16/625; Y10T 16/53834; Y10T 16/5402; G03B 27/62
(Continued)

(56) References Cited

U.S. PATENT DOCUMENTS 4,590,639 A   5/1986   Fritsche et al.
4,686,739 A   8/1987   Fritsche et al.
(Continued)

FOREIGN PATENT DOCUMENTS

DE   3224300    12/1983
JP   57-70526   5/1982
(Continued)

OTHER PUBLICATIONS

Korean Office Action issued Aug. 10, 2015 in Korean Patent Application No. 10-2014-0115326.
(Continued)

*Primary Examiner* — William Miller
(74) *Attorney, Agent, or Firm* — Staas & Halsey LLP

(57) ABSTRACT

An image forming apparatus including a hinge assembly to mutually hinge-connect a main body and a cover unit of the image forming apparatus and the hinge assembly is provided. The image forming apparatus includes a main body, a cover unit configured to be disposed on an upper side of the main body to press a manuscript, and at least one hinge assembly configured to connect the cover unit to the main body, wherein the hinge assembly includes a first body detachably mounted on the main body, a second body of which a part is fastened to the cover unit and another part is
(Continued)

hinge-connected with the first body, a pressing unit accommodated in the first body to press the second body upward, and a pressing force adjuster configured to adjust a hinge force between the first body and the second body.

11 Claims, 17 Drawing Sheets

(52) U.S. Cl.
CPC .... *H04N 1/00519* (2013.01); *E05Y 2201/638* (2013.01); *E05Y 2900/608* (2013.01); *H04N 2201/0094* (2013.01); *H04N 2201/02495* (2013.01); *Y10T 16/5386* (2015.01); *Y10T 16/5402* (2015.01)

(58) Field of Classification Search
USPC .............. 16/298, 274, 322, 72, 85, 289, 321; 399/377, 380; 355/75
See application file for complete search history.

(56) References Cited

U.S. PATENT DOCUMENTS

| | | | |
|---|---|---|---|
| 6,453,804 B1* | 9/2002 | Lee | A23L 3/001 165/206 |
| 6,593,999 B1* | 7/2003 | Hosaka | G03G 15/605 271/265.01 |
| 7,406,747 B2 | 8/2008 | Choi | |
| 7,665,183 B2 | 2/2010 | Choi | |
| 7,949,292 B2 | 5/2011 | Choi | |
| 8,315,549 B2 | 11/2012 | Choi | |
| 8,565,662 B2 | 10/2013 | Choi | |
| 8,676,110 B2 | 3/2014 | Choi | |
| 8,850,660 B2* | 10/2014 | Kim | E05F 1/1058 16/286 |
| 2004/0218229 A1 | 11/2004 | Chol | |
| 2007/0089271 A1* | 4/2007 | Jo | E05D 11/1064 16/286 |
| 2007/0199178 A1* | 8/2007 | Katsumata | E05F 1/1261 16/286 |
| 2008/0263825 A1 | 10/2008 | Choi | |
| 2009/0188078 A1 | 7/2009 | Choi | |
| 2009/0274502 A1 | 11/2009 | Choi | |
| 2013/0038890 A1 | 2/2013 | Choi | |
| 2013/0205540 A1 | 8/2013 | Kim | |
| 2014/0016978 A1 | 1/2014 | Choi | |
| 2014/0137479 A1 | 5/2014 | Choi | |

FOREIGN PATENT DOCUMENTS

| | | |
|---|---|---|
| JP | 6-33656 | 2/1994 |
| JP | 2011-175130 | 9/2011 |
| KR | 10-0180493 | 4/1999 |
| KR | 10-0474425 | 3/2005 |
| KR | 10-2007-0111748 | 11/2007 |

OTHER PUBLICATIONS

International Search Report and Written Opinion of the International Searching Authority mailed Nov. 18, 2014 in International Patent Application PCT/KR2014/006783.

Extended European Search Report dated Feb. 25, 2015 in European Patent Application No. 14184645.1.

* cited by examiner

HINGE ASSEMBLY AND IMAGE FORMING APPARATUS HAVING THE SAME

CROSS-REFERENCE TO RELATED APPLICATIONS

This application claims the priority benefit to U.S. Provisional Patent Application No. 61/876,982, filed on Sep. 12, 2013, in the United States Patent and Trademark Office, and Korean Patent Application No. 10-2013-0116509, filed on Sep. 30, 2013, Korean Patent Application No. 10-2013-0130972, filed on Oct. 31, 2013, and Korean Patent Application No. 10-2014-0115326, filed on Sep. 1, 2014, in the Korean Intellectual Property Office, the disclosures of which are incorporated herein by reference.

BACKGROUND

1. Field

Embodiments relate to a hinge assembly and an image forming apparatus having the same, and more particularly to a hinge assembly that hinge-connects a main body of an image forming apparatus and a cover unit to each other and an image forming apparatus having the same.

2. Description of the Related Art

An image forming apparatus is an apparatus which performs a document scanning function, such as a copy machine, a scanner, or a multifunction peripheral (MFP), and includes a main body having a scan transparent plate on which a document to be scanned is put and a cover unit that can hide the scan transparent plate.

Typically, the cover unit is pivotally connected to the main body through at least one hinge assembly. As a type of hinge assembly for connecting the cover unit and the main body to each other, a hinge assembly, which applies a variable elastic pressing force to the cover unit in accordance with an opening angle of the cover unit so that the cover unit can have a pre-stop function, may be used.

In such a hinge assembly, a coil spring is generally mounted as an elastic member that provides the elastic pressing force. It is ideal that the spring constant of such a coil spring is kept uniform. However, if the coil spring is used for a long time, the spring constant of the coil spring becomes relatively smaller than the spring constant when the coil spring is first manufactured due to plastic deformation of the coil spring.

There is a problem that, if the spring constant of the coil spring becomes smaller due to the long-term use of the coil spring, it is difficult to achieve smooth pre-stop of the cover unit. Further, due to impact that is applied to the main body as the cover unit is abruptly closed at high speed and collided with an upper side of the main body, the scan transparent plate and the cover unit may be damaged.

In order to prevent the above-described problem, there is a method to replace the hinge assembly with new one on a regular basis, but, it costs a lot to repair and replace the hinge assembly.

SUMMARY

One or more embodiments have been made to address at least the above problems and/or disadvantages and to provide at least the advantages described below. Accordingly, an aspect of one or more embodiments solves the plastic deformation problem of an elastic member (e.g., coil spring), which is provided for a pre-stop function in a hinge assembly that connects a main body and a cover unit of an image forming apparatus, at low cost.

According to an aspect of one or more embodiments, there is provided an image forming apparatus including a main body, a cover unit configured to be disposed on an upper side of the main body to press a manuscript, and at least one hinge assembly to connect the cover unit to the main body, wherein the hinge assembly includes a first body detachably mounted on the main body, a second body of which a part is fastened to the cover unit and another part hinge-connected with the first body, and a pressing force adjuster configured to adjust a hinge force between the first body and the second body.

The pressing force adjuster may include a pressing unit accommodated in the first body to keep applying a pressing force to the second body, and an adjustment unit configured to adjust a pressing force of the pressing unit that is applied to the second body.

The pressing may include a pushing member configured to press the second body, and an elastic member configured to elastically support the pushing member in the first body, wherein the adjustment unit may adjust a compressed degree of the elastic member.

The adjustment unit may include an elastic member support plate to support an end of the elastic member and elevatably accommodated in the first body, and a height adjustment member mounted on the first body to adjust a height of the elastic member support plate.

The height adjustment member may include a body portion engaged with the elastic member support plate and fastened to the first body, and a head portion which is integrally formed on the body portion and is exposed outside of the first body.

The body portion may include an engagement portion engaged with the elastic member support plate, and a fastening portion screw-fastened to the first body and having a support plate seating surface to support the elastic member support plate.

An insert nut member may be mounted on the first body to screw-fasten to the body portion of the height adjustment member.

The adjustment unit may further include a locking nut member engaged with the body portion of the height adjustment member.

The first body may include a height checking opening which permits the elastic member support plate to be shown to outside of the first body, and wherein a plurality of height indicating scales, which indicate the height of the elastic member support plate, may be formed on the first body.

The adjustment unit may be detachably screw-fastened on the first body to support an end of the elastic member.

The adjustment unit in a cap shape may include a side portion on which screw threads for screw engagement with the first body are formed along an inner circumferential surface, and a bottom portion to support the end of the elastic member.

The second body may have a curved surface-shaped cam surface, and wherein a pushing portion, configured to press the cam surface of the second body, may be formed to project from an upper surface of the pushing member.

A plurality of lubricant storage grooves, which are filled with lubricant, may be formed on the pushing portion.

The elastic member may be composed of a coil spring.

The center axis of the coil spring may be spaced apart for a predetermined distance from a rotation axis of the second body.

The first body may be mounted on a hinge mount hole that is formed in the main body.

A first projection portion to limit an amount of insertion of the first body into the hinge mount hole may be formed on the first body.

A secession prevention protrusion may be formed inside the hinge mount hole, and a second projection portion, which is caught on the secession prevention protrusion when the cover unit is lifted up, may be formed on the first body.

The adjustment unit may include an elastic member support plate which supports an end of the elastic member, and a height adjustment member of which a part is pivotably accommodated in the first body, and the height adjustment member may adjust height of the elastic member support plate according to rotation, The height adjustment member may include a rotation cam portion which is disposed to contact a lower end of the elastic member support plate, a rotation axis which passes through and is engaged to the rotation cam portion, and both ends are pivotably supported on the first body, and a rotation knob which is engaged to an end of the rotation axis from outside of the first body, and rotates the rotation axis in a direction or a reverse direction, and the rotation cam portion may move the elastic member support plate according to rotation of the rotation knob to adjust a compressed degree of the elastic member.

The first body may include a first housing which is fastened to the main body, and a second housing, in which the pressing unit and the elastic member support plate are accommodated, having the rotation axis which is slidably inserted into a lower end, wherein the second housing is inserted inside the first housing, and the rotation axis and the rotation cam member are positioned on a lower side of the second housing.

The second body may have a cutting groove on the bottom portion so that an inner bottom portion is not interfered when the rotation cam member rotates.

According to an aspect of one or more embodiments, there is provided a hinge assembly mutually connecting an image forming apparatus main body to a cover unit which is disposed on the main body to press a manuscript. The hinge assembly includes a first body detachably mounted on the main body, a second body of which a part is fastened to the cover unit and another part is hinge-connected with the first body, and a pressing force adjuster to adjust a hinge force between the first body and the second body.

BRIEF DESCRIPTION OF THE DRAWINGS

The above and other aspects, features and advantages of embodiments will be more apparent from the following detailed description when taken in conjunction with the accompanying drawings, in which.

DETAILED DESCRIPTION

Figure 1:
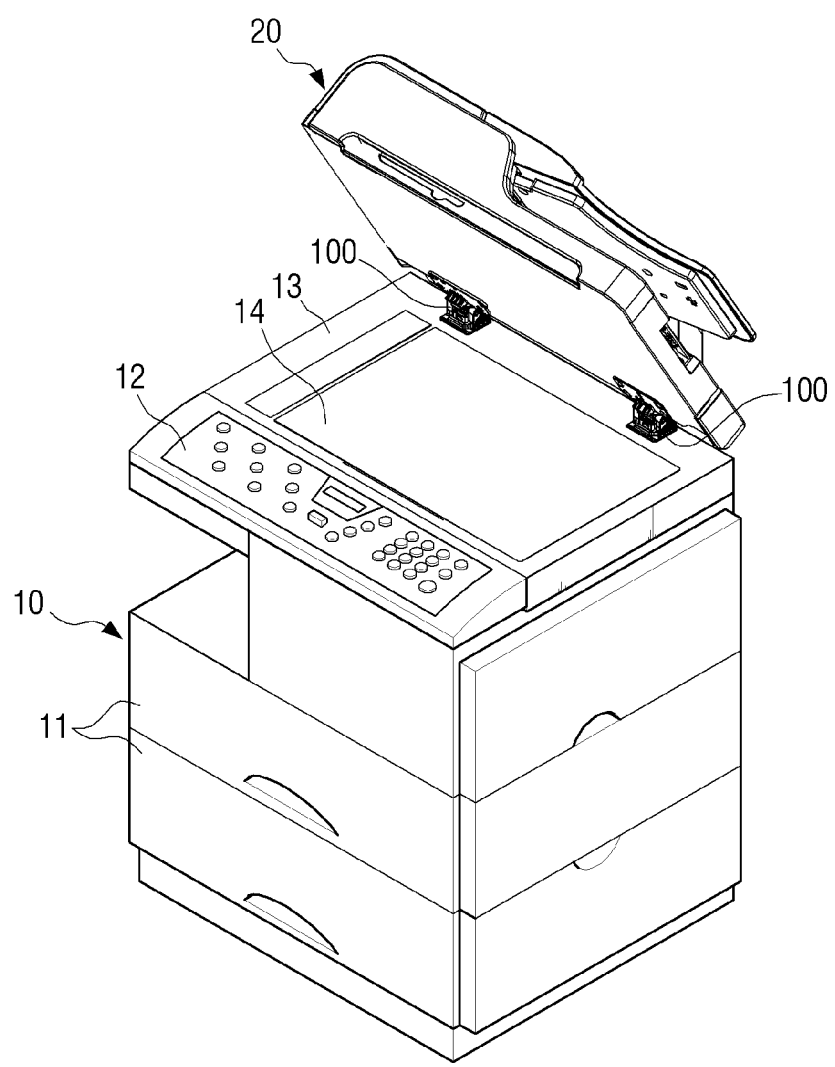
FIG. 1 is a perspective view of an image forming apparatus according to an embodiment.

Reference will now be made in detail to embodiments, examples of which are illustrated in the accompanying drawings, wherein like reference numerals refer to the like elements throughout.

The image forming apparatus according to an embodiment is a multifunction peripheral (MFP) having printing, scanning, and copying functions. In an embodiment, it is exemplified that the image forming apparatus is the MFP, but the embodiments are not limited to the MFP, but may be applied to other types of image forming apparatuses such as a scanner and a copy machine in the same manner.

Figure 2:
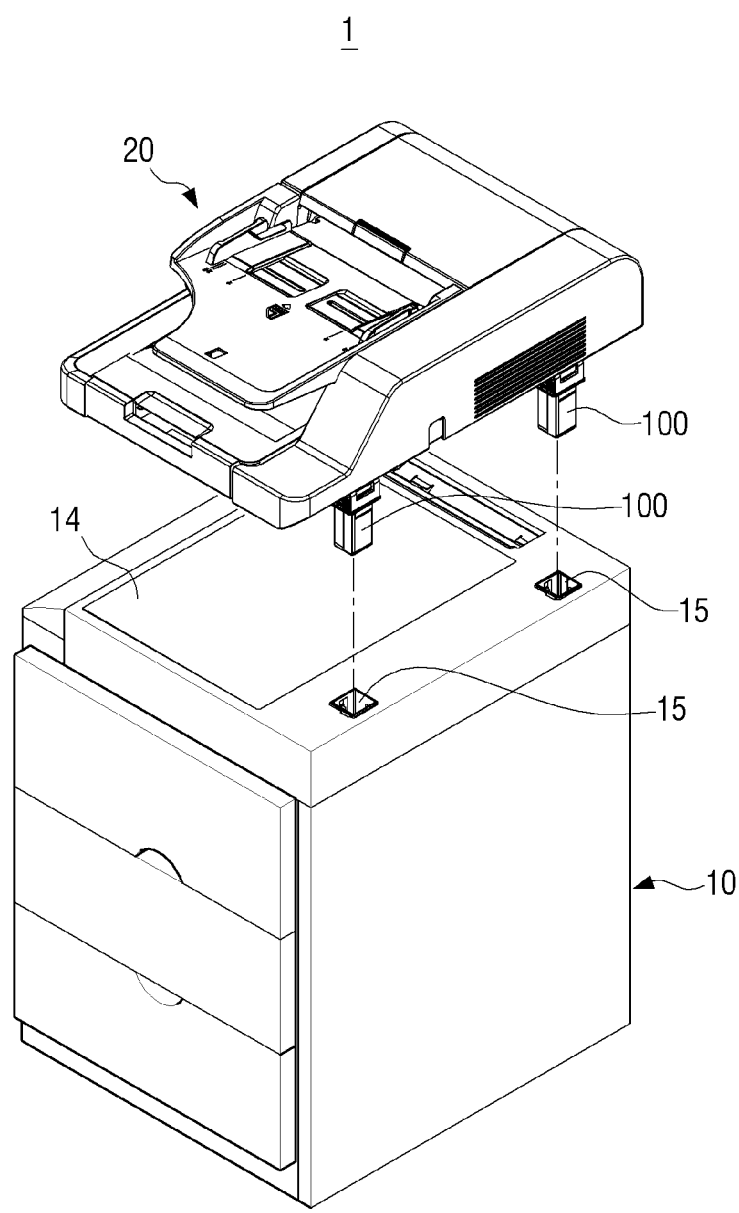
FIG. 2 is a view illustrating the image forming apparatus of FIG. 1 in a state where a cover unit is separated from a main body illustrated in FIG. 1.

FIG. 1 is a perspective view of an image forming apparatus according to an embodiment, and FIG. 2 is a perspective view which describes a state where a cover unit is separated from a main body illustrated in FIG. 1.

Referring to FIG. 1, the image forming apparatus 1 includes a main body 10, a cover unit 20, and two hinge assemblies 100.

In the main body 10, a plurality of paper cassettes 11 accommodating printing papers, and a button board 12 provided with a plurality of operation buttons for operating the image forming apparatus 1 are provided. An image forming portion (not illustrated) for providing a printing function and a scanning portion (not illustrated) for providing a scanning function are provided inside the main body 10. Since the internal structure of the main body 10 is not required to explain one or more embodiments, the detailed description thereof will be omitted. On an upper surface 13 of the main body 10, a scan transparent plate 14, on which an object to be scanned (e.g., document, ID card, or card) is put, is provided.

The cover unit 20 is pivotally connected to the main body 10 by the two hinge assemblies 100. For example, the cover unit 20 may have maximum rotation angle of 90° or more. Accordingly, the cover unit 20 may have a closing position in which the cover unit 20 covers and hides the upper surface 13 of the main body 10 on which the scan transparent plate 14 is arranged, or an open position in which the upper surface 13 of the main body 10 is exposed to an outside. For example, when a user puts an object to be scanned, such as a document, on the scan transparent plate 14, the cover unit 20 is arranged in the open position, while when a scan job is performed, the cover unit 20 is arranged in the closing position.

The cover unit 20 provides a function of automatically feeding documents to be copied in addition to a function of hiding the upper surface 13 of the main body 10. The cover unit 20, which also has the function of automatically feeding the documents as described above, is typically called an automatic document feeder (ADF), and has a complicated structure and heavy weight as compared with cover units that perform only the function of hiding the upper surface 13 of the main body 10.

The two hinge assemblies 100 are configured to pivotally connect the cover unit 20 to the main body 10. For example, the respective hinge assemblies 100 are mounted on the main body 10 in a manner that upper portions of the hinge assemblies 100 are fixed to the cover unit 20 through screw engagement, and the hinge assemblies 100 are inserted into hinge mount holes 15 (see FIG. 2) that are formed on the upper surface 13 of the main body 10. In this example, the hinge assemblies 100 pivotably connect the cover unit 20 to the main body 10. As described above, since the hinge assemblies 100 are mounted on the main body 10 through simple insertion into the hinge mount holes 15 without the help of other fastening devices (e.g., screws), the cover unit 20, with which the hinge assemblies 100 are engaged, can be easily separated from the main body 10 only by lifting up the cover unit 20. Although the hinge assemblies 100 are simply inserted into the main body 10 without using other fastening devices, they are kept in a downwardly pressed state due to the weight of the cover unit 20, and thus they are not separated from the main body 10 unless a user or an operator lifts up the cover unit 20.

The cover unit 20 can be pivoted up to a predetermined maximum rotation angle (e.g., 120°) against the main body 10 by using the hinge assemblies 100. Further, the cover unit 20 can have a pre-stop function in a specific angle range (e.g., 10° to 60°) by using the hinge assemblies 100. For example, if the cover unit 20 is moved to have an angle of 40° against the main body 10 by a user's operation, the cover unit 20 is kept at the angle (40°) even if the user does not hold the cover unit 20.

In an embodiment, it is exemplified that the image forming apparatus 1 has two hinge assemblies 100. However, in alternative embodiments, the number of hinge assemblies provided in the image forming apparatus 1 may be changed to one, three, or the like.

Figure 3:
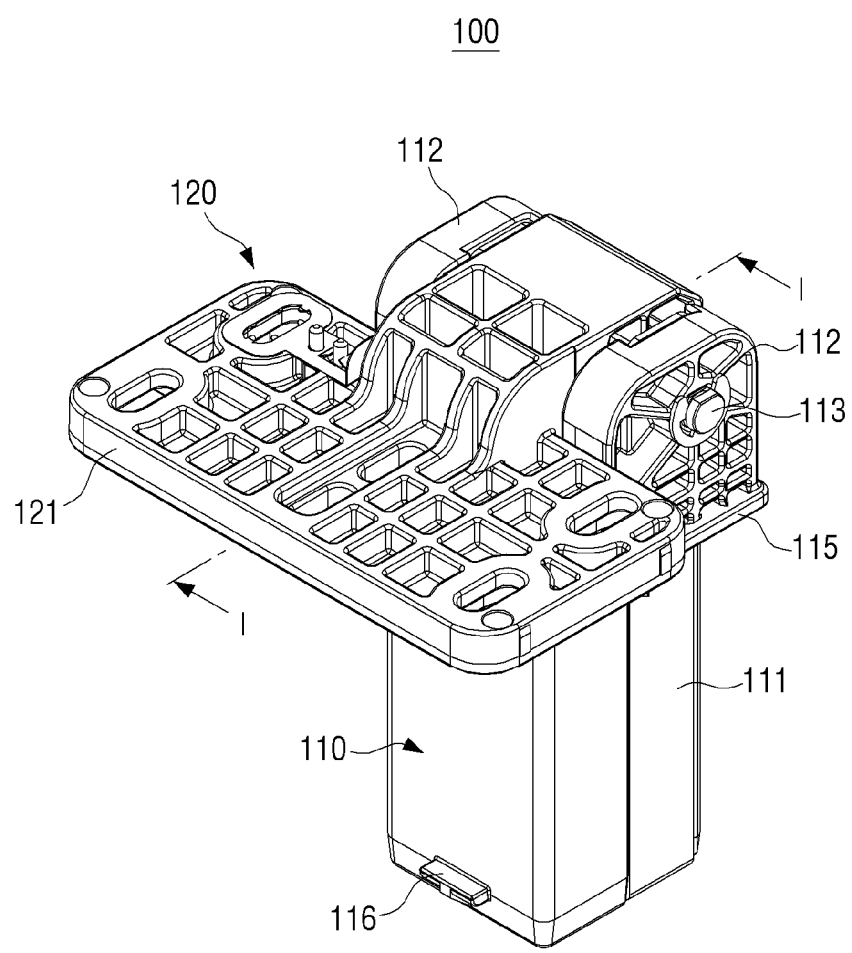
FIG. 3 is a perspective view of a hinge assembly illustrated in FIG. 1.
Figure 4:
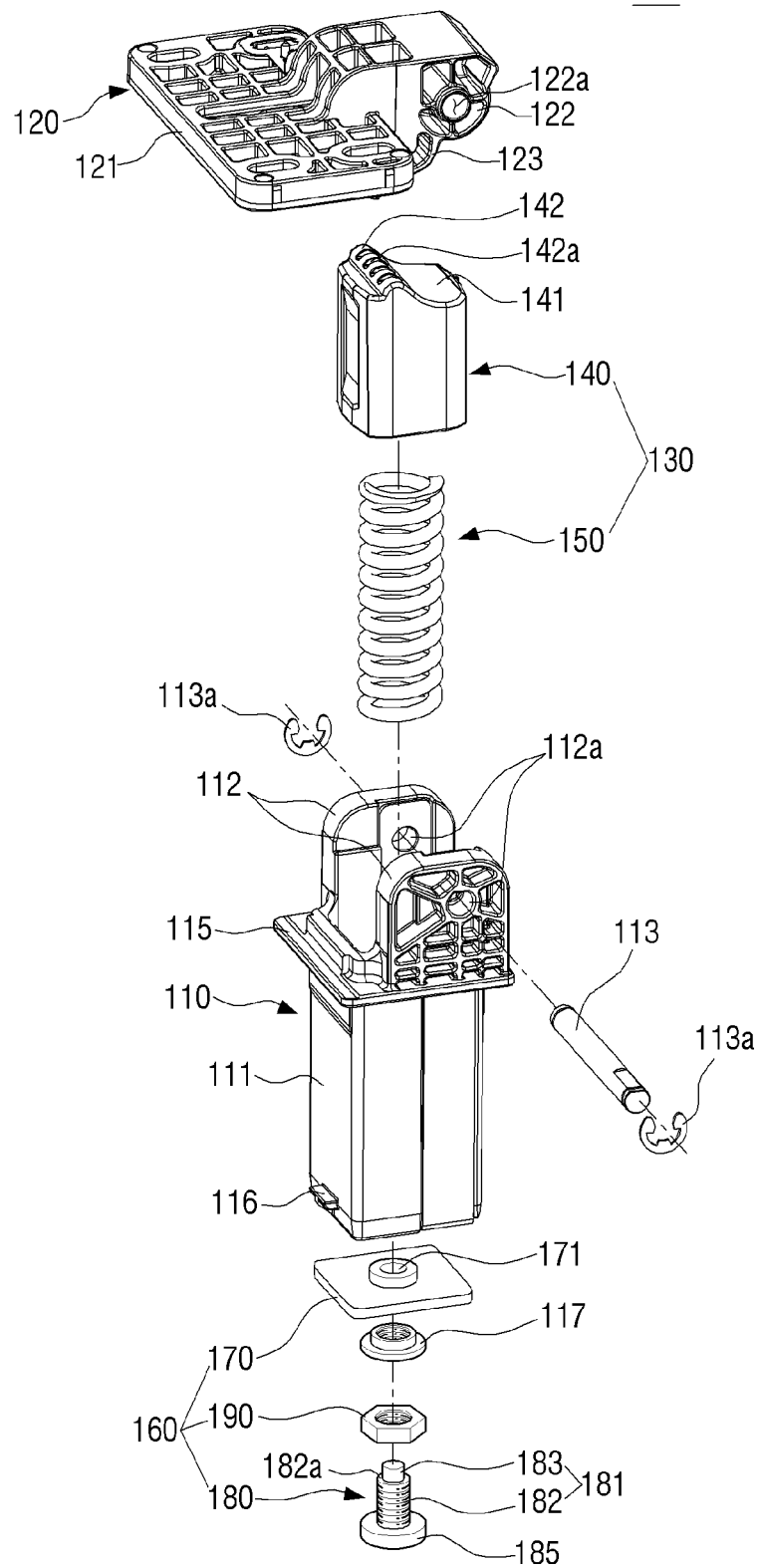
FIG. 4 is an exploded perspective view of the hinge assembly illustrated in FIG. 3.
Figure 5:
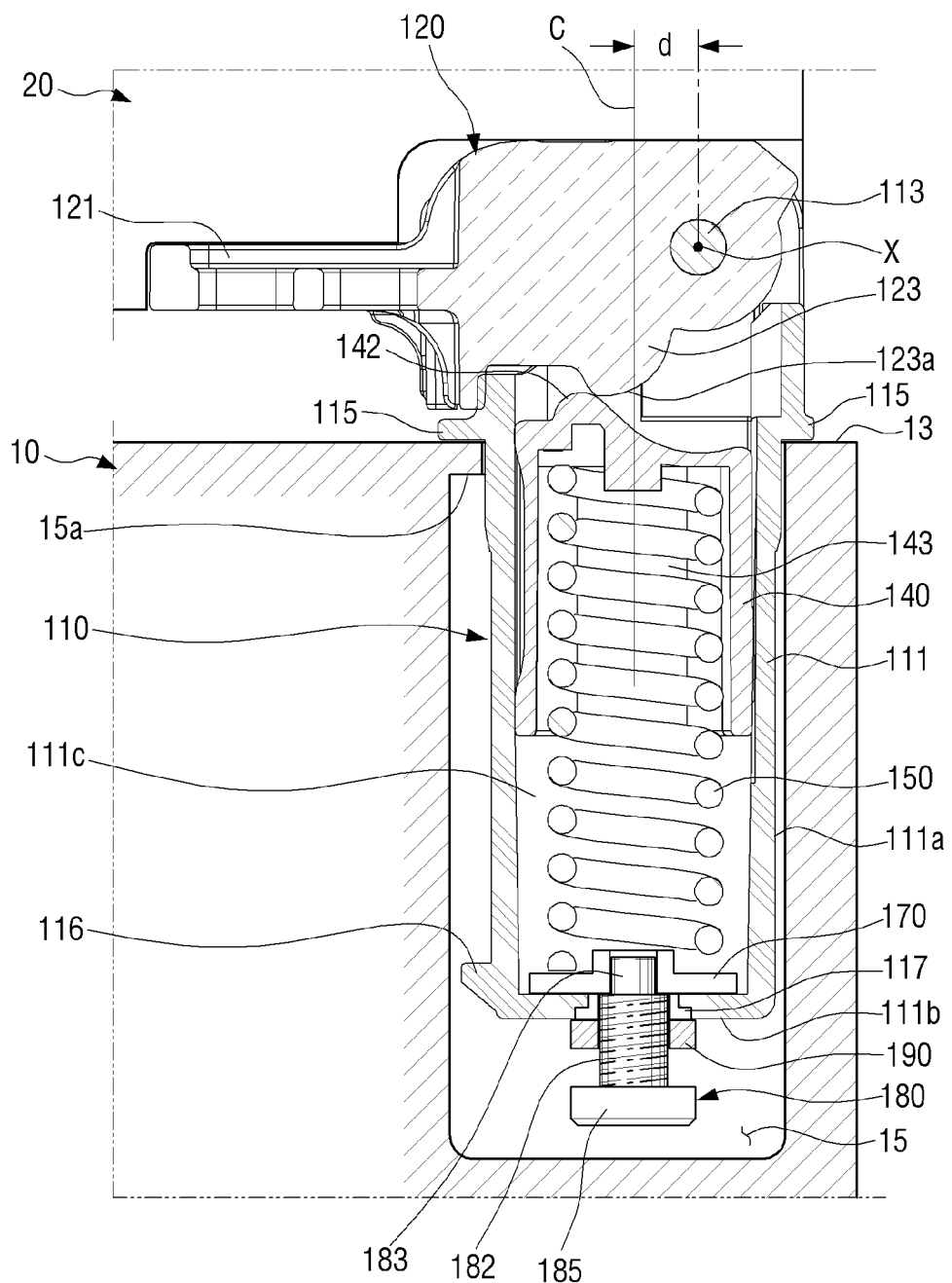
FIG. 5 is a cross-sectional view of the hinge assembly illustrated in FIG. 3 taken along line I-I of FIG. 3.

Referring to FIGS. 3 to 5, the hinge assembly 100 will be described in more detail. FIG. 3 is a perspective view of a hinge assembly provided in the image forming apparatus of FIG. 1. FIG. 4 is an exploded perspective view of the hinge assembly of FIG. 3, and FIG. 5 is a cross-sectional view of the hinge assembly of FIG. 3 taken along line I-I of FIG. 3.

The hinge assembly 100 includes a first body 110 mounted on the main body 10 of the image forming apparatus 1, a second body 120 mounted on the cover unit 20 of the image forming apparatus 1, a pressing unit 130 configured to press the second body 120 upward, and a pressing force adjustment unit 160 configured to adjust a pressing force of the pressing unit 130 that is applied to the second body 120.

The first body 110 is separably mounted on the main body 10 of the image forming apparatus 1 through insertion into the hinge mount hole 15 (see FIG. 2) as described above.

When the hinge assembly 100 is mounted on the main body 10, the first body 110 is kept to be simply inserted into the hinge mount hole 15, and thus can be easily separated from the hinge mount hole 15 if needed.

The first body 110 includes a housing 111 in the form of a rectangular container, and a pair of support brackets 112 extending upward from an upper portion of the housing 111.

The housing 111 includes a side portion 111a and a bottom portion 111b, and an accommodation chamber 111c for accommodating the pressing unit 130 is formed in the housing 111. When the hinge assembly 100 is mounted on the main body 10, the housing 111 of the first body 110 is inserted into the hinge mount hole 15 (see FIG. 2).

The pair of support brackets 112 correspond to portions with which the second body 120 is hinge-engaged using a hinge shaft 113. On each of the support brackets 112, a shaft hole 112a, into which the hinge shaft 113 is inserted, is formed. As illustrated in FIG. 4, two engagement rings 113a are inserted into both end portions of the hinge shaft 113, and the hinge shaft 113 is prevented from being separated from the support bracket 112.

On the first body 110, a first projection portion 115 is formed between the housing 111 and the support brackets 112 to horizontally project to an outside. When the hinge assembly 100 is mounted in the hinge mount hole 15 (see FIG. 2) of the main body 10, the first projection portion 115 of the first body 110 is caught on the upper surface 13 of the main body 10. Accordingly, only the housing 111 of the first body 110 is inserted into the main body hinge mount hole 15, and the support brackets 112 of the first body 110 are exposed out of the main body 10. As described above, the first projection portion 115 limits the amount of insertion of the first body 110 into the hinge mount hole 15.

On the first body 110, a second projection portion 116 is formed on the lower portion of the housing 111. When the hinge assembly 100 that is mounted on the main body 10 is lifted up together with the cover unit 20, the second projection portion 116 of the first body 110 is caught on a secession prevention protrusion 15a (see FIG. 5) formed in the hinge mount hole 15, and thus the hinge assembly 100 is prevented from unintentionally seceding out of the hinge mount hole 15. If it is necessary to separate the hinge assembly 100 from the hinge mount hole 15, the hinge assembly 100 may be further pulled after being slightly tilted so that the catching of the second projection portion 116 is released.

An insert nut member 117 is provided in the center of the bottom portion 111b of the first body 110. For example, the insert nut member 117 may be mounted on the first body 110 through an insert molding process. Alternatively, female screw threads may be directly formed on the bottom portion 111b of the first body 110 in replacement of the insert nut member 117, and in this case, the insert nut member can be omitted. The role of the insert nut member 117 as described above will be introduced in the following description of the pressing force adjustment unit 160.

The second body 120 includes a cover engagement portion 121 fixedly engaged with the cover unit 20 through fastening devices, such as screws, and a hinge engagement portion 122 hinge-engaged with the support bracket 112 of the first body 110 through the hinge shaft 113. A shaft hole 122a, through which the hinge shaft 113 passes, is formed on the hinge engagement portion 122.

Since the second body 120 is hinge-engaged with the first body 110 using the hinge shaft 113, the second body 120 and the cover unit 20 engaged with the second body 120 are pivotable against the first body 110 around the rotation axis Z (see FIG. 5) that passes through the center of the hinge shaft 113.

On the second body 120, a cam portion 123 is formed between the cover engagement portion 121 and the hinge engagement portion 122. The cam portion 123 has a curved cam surface 123a that comes in contact with the pressing unit 130 to receive the pressing force from the pressing unit 130. In accordance with the rotation angle of the cover unit 20, the region of the cam surface 123a that comes in contact with the pressing unit 130 is changed, and thus the level of the pressing force that is provided from the pressing unit 130 is varied in accordance with the rotation angle of the cover unit 20.

Since the pressing unit 130 presses the second body 120 upward, the cover unit 20 that is connected to the second body 120 is prevented from being abruptly closed, and the cover unit 20 can have a pre-stop function in a specific angle range (e.g., 10° to 60°).

The pressing unit 130 includes a pushing member 140 that presses the second body 120 and an elastic member 150 that provides the pressing force to the pushing member 140.

The pushing member 140 is accommodated in the housing 111 of the first body 110 so that the pushing member 140 can slide upward and downward. The pushing member 140 has a shape that matches the shape of the accommodation chamber 111c (see FIG. 5) provided in the housing 111 so that upward/downward sliding of the pushing member 140 can be smoothly guided by an inner wall of the housing 111.

On an upper surface 141 of the pushing member 140, a pushing portion 142 that comes in contact with the first body 110 is formed to project. As illustrated in FIG. 5, the pushing portion 142 is arranged to come in contact with the cam portion 123 of the second body 120, and thus the pressing force that is provided by the elastic member 150 is transferred to the second body 120. A plurality of lubricant supply grooves 142a are formed on the pushing portion 142. The lubricant supply grooves 142a are filled with lubricant, such as grease, and such lubricant is supplied between the pushing member 140 and the first body 110 to mitigate friction that occurs between the pushing member 140 and the first body 110 during rotation of the cover unit 20.

The elastic member 150 is composed of a coil spring accommodated in the housing 111 of the first body 110, and an upper portion of the elastic member 150 is inserted into a spring support hole 143 that is formed on the pushing member 140. The elastic member 150 is kept in a compressed state in the housing 111, and thus the elastic member 150 can provide an elastic pressing force to the cover unit 20 through the pushing member 140.

As illustrated in FIG. 5, the center axis C of the elastic member 150 is spaced apart for a predetermined distance d from the rotation axis X of the cover unit 20 and the first body 110 as described above. Accordingly, the pressing force that the elastic member 150 applies to the first body 120 may act as a force that resists gravity that acts on the cover unit 20 to close the cover unit 20. Accordingly, the cover unit 20 is prevented from being abruptly closed, and the pre-stop function of the cover unit 20 can be achieved.

It is ideal that the spring constant of the elastic member 150 is kept constant. However, the spring constant K1 of the elastic member 150 after a long-term use of the elastic member 150 may be smaller than the initial spring constant K0 of the elastic member 150. Accordingly, the stiffness of the elastic member 150 is weakened with the lapse of time.

The weakening of the stiffness of the elastic member 150 is generally caused by the plastic deformation of the elastic member 150.

If the stiffness of the elastic member 150 is weakened with the lapse of time, the elastic pressing force that the elastic member 150 applies to the cover unit 20 becomes insufficient, and thus the cover unit 20 in an open state is abruptly closed or the pre-stop function of the cover unit 20 is unable to be achieved.

Specifically, if it is assumed that the compressed length of the elastic member 150 is $\delta$ when the rotation angle of the cover unit 20 is 0°, the cover unit 20 can smoothly operate only in the case where the elastic member 150 applies the elastic pressing force that corresponds to $F0=K0\times\delta$ to the cover unit 20 at the rotation angle of 0°. However, if the elastic member 150 has the spring constant K1 that is smaller than the initial spring constant K0 due to the weakening of the stiffness of the elastic member 150 as described above, the elastic pressing force that the elastic member 150 applies to the cover unit 20 at the rotation angle of 0° is also weakened to $F1=K1\times\delta$. This elastic pressing force F1 corresponds to the value that is decreased to the extent of $\Delta F=F0-F1=(K0-K1)\times\delta$ in comparison to the initial elastic pressing force F0. The weakening of the elastic pressing force occurs in the same principle not only at the rotation angle of 0° but also at other rotation angles, and this causes the occurrence of the above-described problems (abrupt closing of the cover unit and non-achievement of the pre-stop of the cover unit).

The pressing force adjustment unit 160 is provided to solve the above-described problems caused by the weakening of the stiffness of the elastic member 150, and includes an elastic member support plate 170, a height adjustment member 180, and a locking nut member 190.

The elastic member support plate 170 is arranged to face the bottom portion 111b of the housing 111 in the first body 110, and supports the lower end of the elastic member 150. The elastic member support plate 170 is substantially in the shape of a rectangular plate, but may alternatively have a different shape such as a circular plate. A screw insertion hole 171, through which the height adjustment member 180 passes, is formed in the center portion of the elastic member support plate 170.

The height adjustment member 180 is in the shape of a bolt, and includes a body portion 181 that is fastened to the first body 110 and a head portion 185 that is exposed outside of the first body 110. The body portion 181 includes a fastening portion 182 that is screw-fastened to the insert nut member 117 provided on the first body 110, and an engagement portion 183 that is inserted into the screw insertion hole 171 and is engaged with the elastic member support plate 170. Screw threads for screw fastening to the insert nut member 117 are formed on an outer periphery of the fastening portion 182, and a support plate seating surface 182a, on which the elastic member support plate 170 is seated, is formed at an upper end of the fastening portion 182.

If the height adjustment member 180 is rotated in a forward direction, the height adjustment member 180 further enters into the first body 110, and thus the elastic member support plate 170 that is engaged with the height adjustment member 180 is lifted and is arranged at a higher position. In this case, length of the elastic member 150 that is supported on the elastic member support plate 170 is reduced as long as the lifted amount of the elastic member support plate 170, and thus is in a further compressed state.

In an embodiment, the engagement portion 183 of the height adjustment member 180 is simply inserted into the screw insertion hole 171 of the elastic member support plate 170. However, alternatively, screw threads may be formed on the outer periphery of the engagement portion 183 and the inner periphery of the screw insertion hole 171, and thus the engagement portion 183 may be screw-fastened to the screw insertion hole 171.

The locking nut member 190 is fastened to the fastening portion 182 of the height adjustment member 180. The locking nut member 190 is usually kept in a state where the locking nut member 190 is firmly tightened toward the first body 110 in order to prevent the natural release of the height adjustment member 180. If the height adjustment of the elastic member support plate 170 is necessary, the locking nut member 190 becomes spaced apart from the first body 110 so that the tightening of the first body 110 is released, and thus the height adjustment member 180 becomes rotatable.

Figure 6:
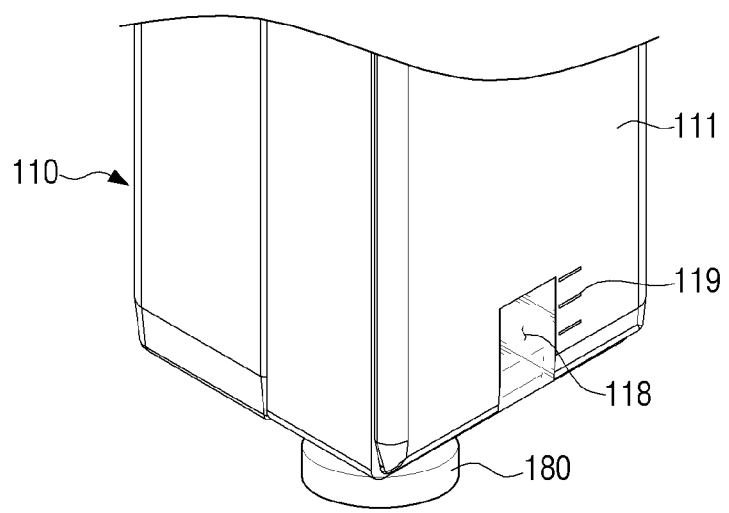
FIG. 6 is a partially-enlarged perspective view illustrating a lower end portion of the hinge assembly illustrated in FIG. 3.

Referring to FIG. 6 illustrating the lower portion of the hinge assembly 100, a height checking opening 118 configured to make the elastic member support plate 170 arranged in the housing 111 be shown from an outside and a plurality of height indicating scales 119 configured to indicate the height change amount of the elastic member support plate 170 are formed on the lower portion of the housing 111 of the first body 110. Accordingly, when the height of the elastic member support plate 170 is adjusted, an operator can confirm the height change of the elastic member support plate 170 with the eyes through the height checking opening 118, and thus accurately adjust the height of the elastic member support plate 170 through the height indicating scales 119.

Figure 7:
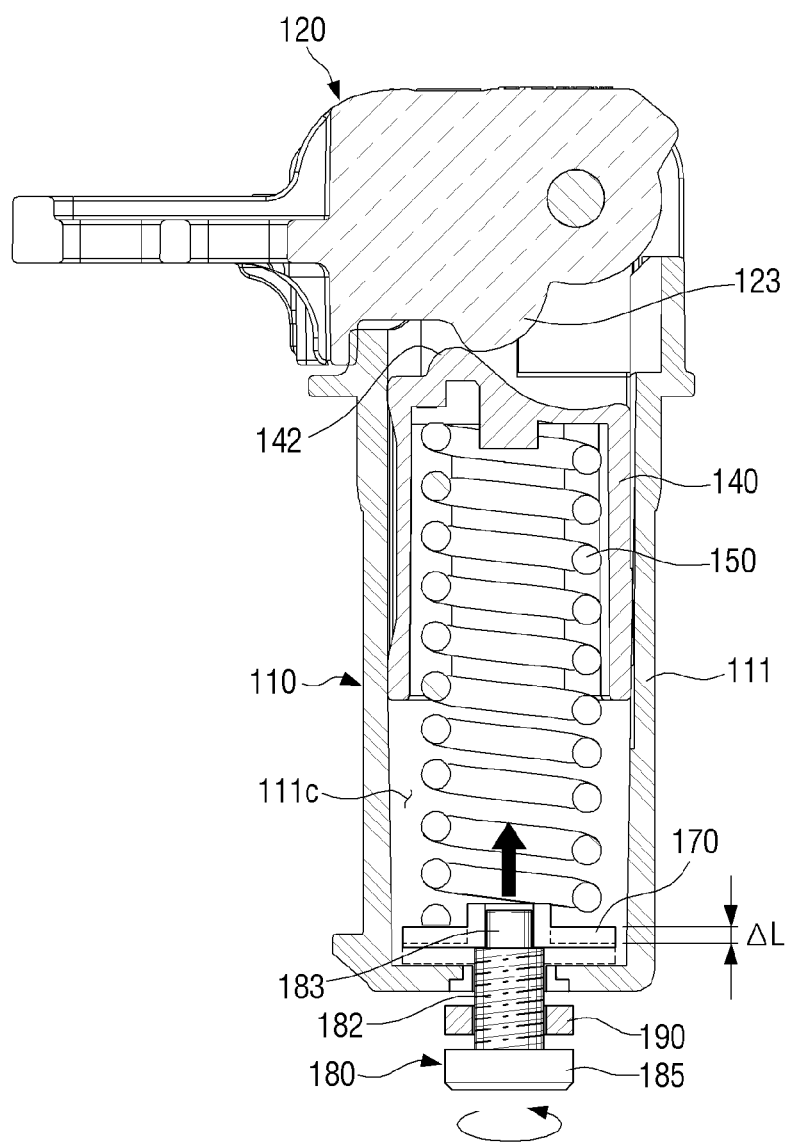
FIG. 7 is a cross-sectional view, which is similar to FIG. 5, explaining a procedure for adjusting pressing force of a pressing unit using a pressing force adjustment unit.

Referring to FIG. 7, a procedure for adjusting the pressing force of the elastic member 150 using the pressing force adjustment unit 160 will be described in more detail as follows.

As described above, if the stiffness of the elastic member 150 is weakened due to the plastic deformation of the elastic member 150 as compared with that at the manufacturing time of the elastic member 150, problems that the open cover unit 20 is abruptly closed or the pre-stop function of the cover unit 20 is unable to be achieved may occur. If such problems occur, the weakened stiffness of the elastic member 150 can be compensated for through the user's (or operator's) increasing of the pressing force of the elastic member 150 using the pressing force adjustment unit 160 as described above.

First, the locking of the locking nut member 190 is released by rotating the locking nut member 190 in a reverse direction so that the height adjustment member 180 becomes rotatable.

Thereafter, as illustrated in FIG. 7, the elastic member support plate 170 that is engaged with the height adjustment member 180 is lifted up as high as the lifted height $\Delta L$ that is required to adjust the pressing force by rotating the height adjustment member 180 in the forward direction.

Then, the elastic member 150 is further compressed as high as the lifted height $\Delta L$, and the elastic pressing force that the elastic member 150 provides to the cover unit 20 is increased as high as $K1 \times \Delta L$. Here, K1 denotes the current spring constant of the elastic member 150 having the weakened stiffness. By the increased elastic pressing force $K1 \times \Delta L$ of the elastic member 150 that is obtained by the operation of the height adjustment member 180, the above-described elastic pressing force $\Delta F = F0 - F1 = (K0 - K1) \times \delta$, which is decreased due to the weakening of the stiffness of the elastic member 150, is compensated for. The value of the lifted height $\Delta L$ of the elastic member 150 that is required to compensate for the weakened elastic pressing force may be determined from data of the stiffness change of the elastic member 150 with the lapse of time, or may be found in a trial and error method by an operator.

Last, if the height adjustment is completed, in order to prevent the natural release of the height adjustment member 180, the locking nut member 190 is rotated in the forward direction until the locking nut member 190 comes in close contact with the first body 110.

Hereinafter, referring to FIGS. 8 to 11, a hinge assembly 100A will be described as an alternative of the above-described hinge assembly 100.

Figure 8:
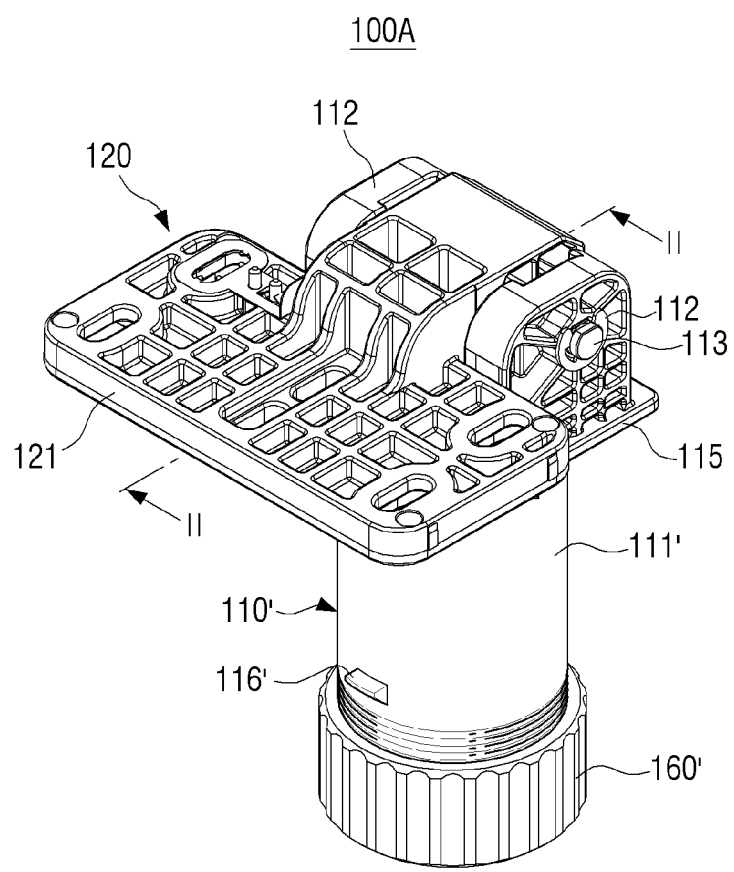
FIG. 8 is a perspective view of another hinge assembly that is applicable to the image forming apparatus of FIG. 1.
Figure 9:
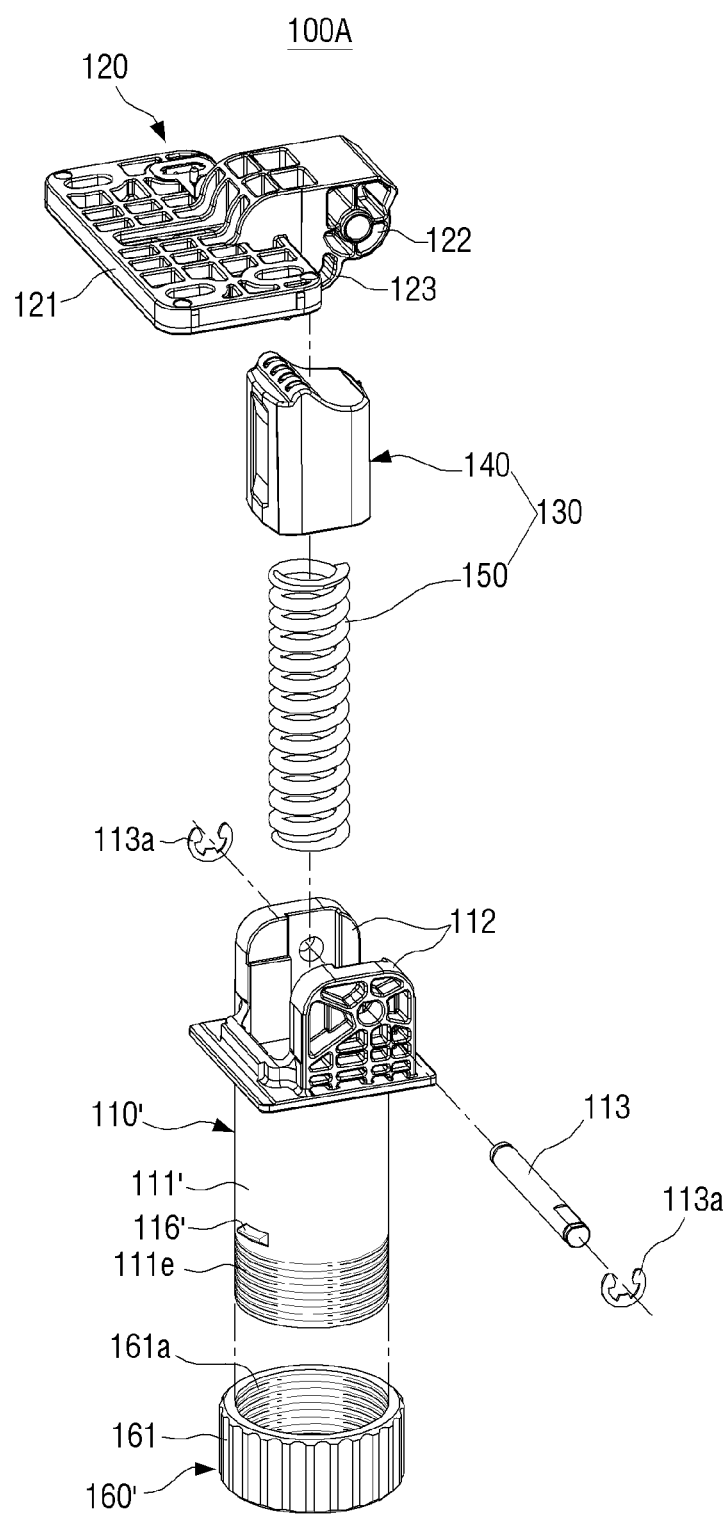
FIG. 9 is an exploded perspective view of the hinge assembly of FIG. 8.
Figure 10:
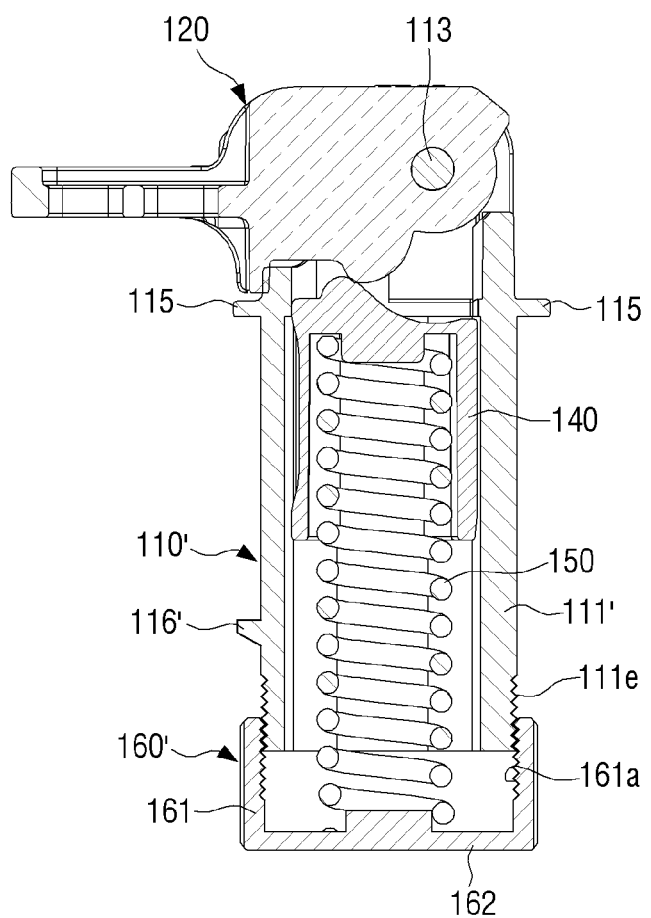
FIG. 10 is a cross-sectional view of the hinge assembly illustrated in FIG. 8 taken along line II-II of FIG. 8.
Figure 11:
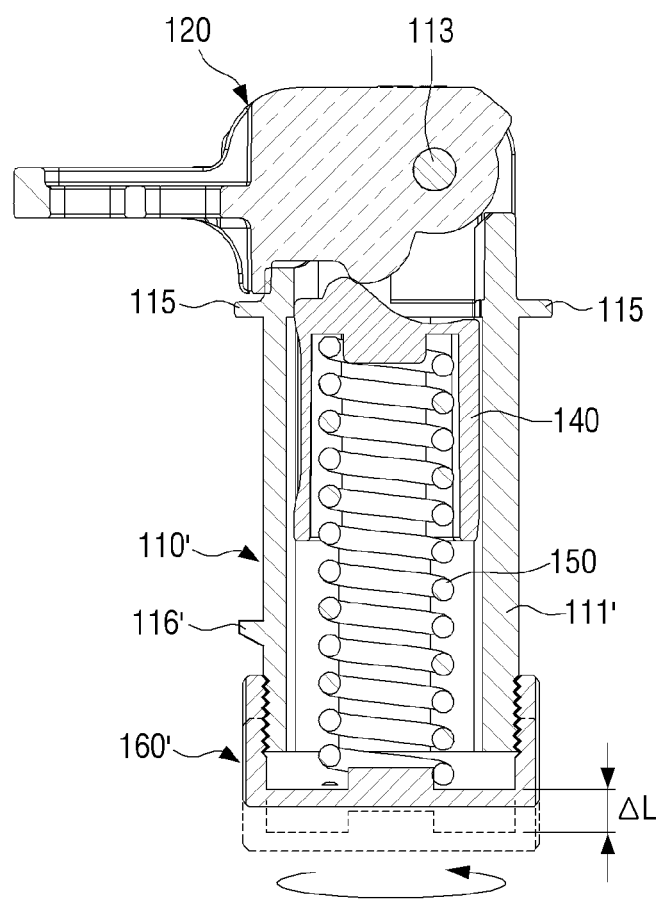
FIG. 11 is a cross-sectional view, which is similar to FIG. 10, explaining a procedure for adjusting pressing force of a pressing unit using a pressing force adjustment unit.

FIG. 8 is a perspective view of another hinge assembly that is applicable to the image forming apparatus of FIG. 1. FIG. 9 is an exploded perspective view of the hinge assembly of FIG. 8, and FIG. 10 is a cross-sectional view of the hinge assembly of FIG. 8 taken along line II-II of FIG. 8. FIG. 11 is a cross-sectional view, which is similar to FIG. 10, explaining a procedure for adjusting pressing force of a pressing unit using a pressing force adjustment unit.

Referring to FIGS. 8 to 11, an alternative hinge assembly 100A includes a first body 110' mounted on a main body 10 of an image forming apparatus 1, a second body 120 mounted on the cover unit 20 of the image forming apparatus 1, a pressing unit 130 configured to press the second body 120 upward, and a pressing force adjustment unit 160' configured to adjust a pressing force of the pressing unit 130 that is applied to the second body 120.

The second body 120 and the pressing unit 130 of the hinge assembly 100A are configured in the same manner as the second body 120 and the pressing unit 130 of the hinge assembly 100 as described above.

The first body 110' and the pressing force adjustment unit 160' of the hinge assembly 100A and the first body 110 and the pressing force adjustment unit 160 of the hinge assembly 100 as described above will be compared with each other as follows.

According to the first body 110' of the hinge assembly 100A, the housing 111' is in the form of a cylinder of which upper and lower sides are open, whereas the housing 111 of the hinge assembly 100 as described above is in the shape of a rectangular container. Further, as illustrated in FIG. 9, screw threads 111e for fastening the pressing force adjustment unit 160' are formed on a lower portion of an outer surface of the housing 111' of the hinge assembly 100A.

A second projection portion 116' is formed on the first body 110' of the hinge assembly 100A. The second projection portion 116' performs the same function as the second projection portion 116 (see FIG. 3) provided on the hinge assembly 100 as described above. That is, when the hinge assembly 100A that is mounted on the main body 10 of the image forming apparatus 1 is lifted up together with the cover unit 20, the second projection portion 116' of the first body 110' is caught on the secession prevention protrusion 15a (see FIG. 5) that is formed in the hinge mount hole 15, and thus the hinge assembly 100A is prevented from unintentionally seceding out of the hinge mount hole 15.

The pressing force adjustment unit 160' of the hinge assembly 100A is different from the pressing force adjustment unit 160 of the hinge assembly 100 as described above on the point that the pressing force adjustment unit 160' is composed of a cap-shaped single member. The pressing force adjustment unit 160' includes a side portion 161 and a bottom portion 162. Screw threads 161a for fastening to the housing 111' are formed on an inner surface of the side portion 161, and the bottom portion 162 supports the lower end of the elastic member 160.

As illustrated in FIG. 11, if it is necessary to adjust the pressing force of the elastic member 150 due to the stiffness weakening of the elastic member 150, the pressing force adjustment unit 160' is lifted as high as the height ΔL that is required to adjust the pressing force by rotating the pressing force adjustment member 160' that is fastened to the first body 110'. Accordingly, the elastic member 150 that is supported by the pressing force adjustment unit 160' is further compressed as high as the height ΔL thereof, and thus the pressing force of the elastic member 150, which has been decreased due to the stiffness weakening of the elastic member 150, can be compensated for.

Hereinbelow, with reference to FIG. 12-17, the configurations of the image forming apparatus 1a according to the second embodiment and the hinge assembly 200 that is applied to the image forming apparatus will be explained.

Figure 12:
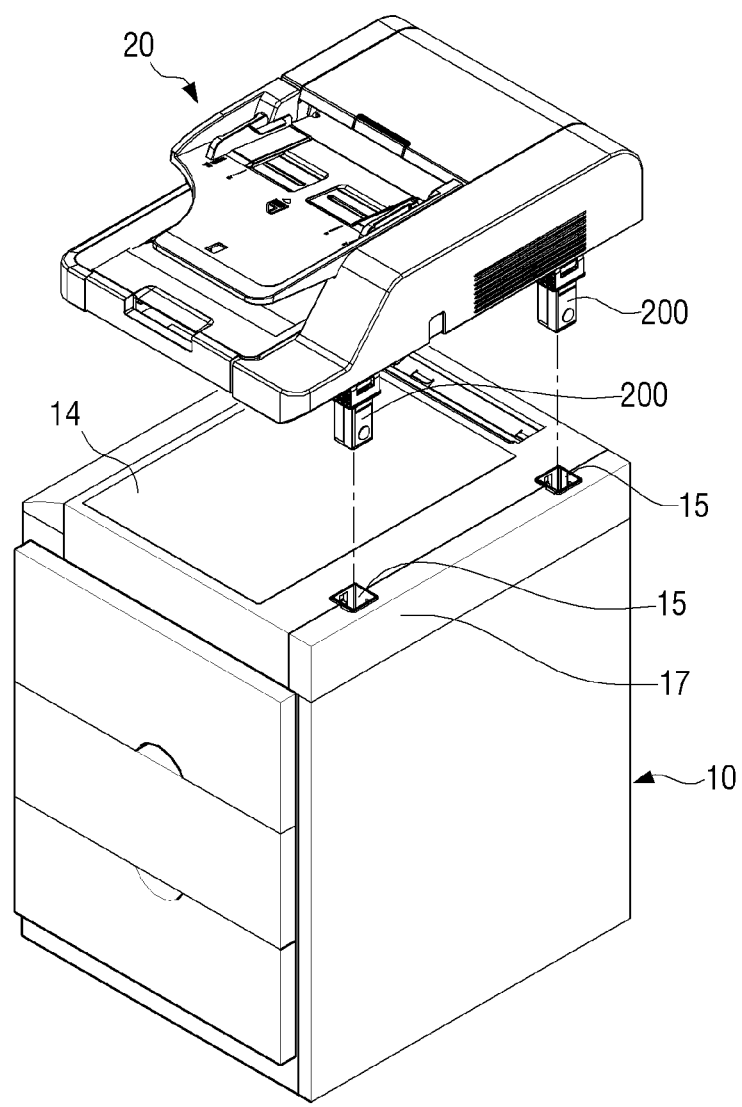
FIG. 12 is a perspective view of the image forming apparatus according to the second exemplary embodiment.
Figure 13:
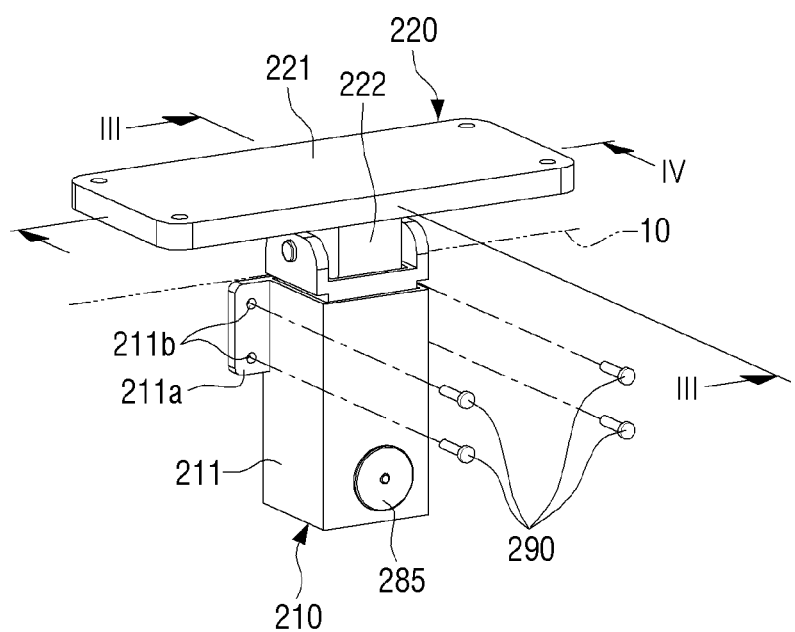
FIG. 13 is a perspective view illustrating the hinge assembly that is applicable to the image forming apparatus illustrated in FIG. 12.
Figure 14:
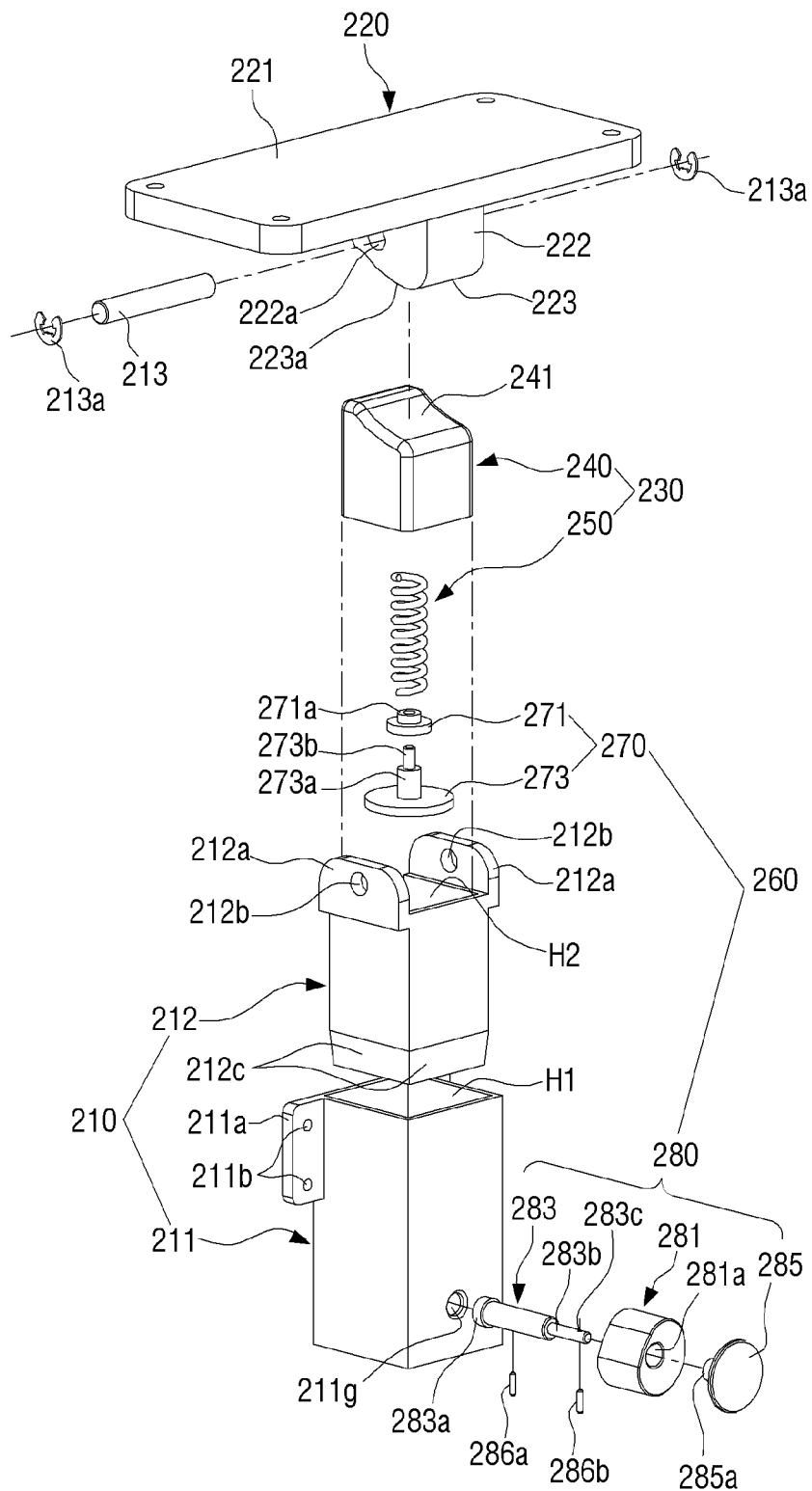
FIG. 14 is an exploded perspective view of the hinge assembly illustrated in FIG. 13
Figure 15:
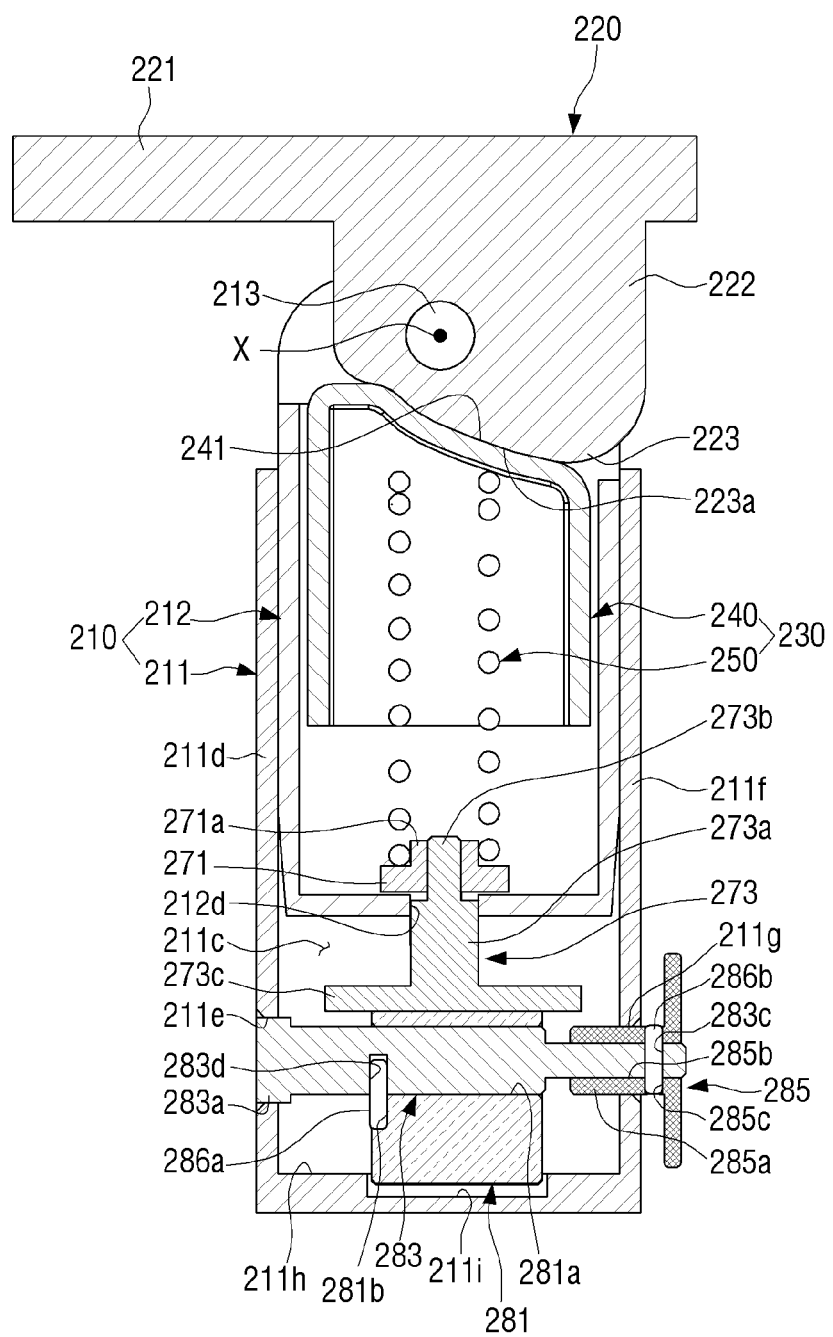
FIG. 15 is a cross-sectional view taken along line III-III illustrated in FIG. 13.
Figure 16:
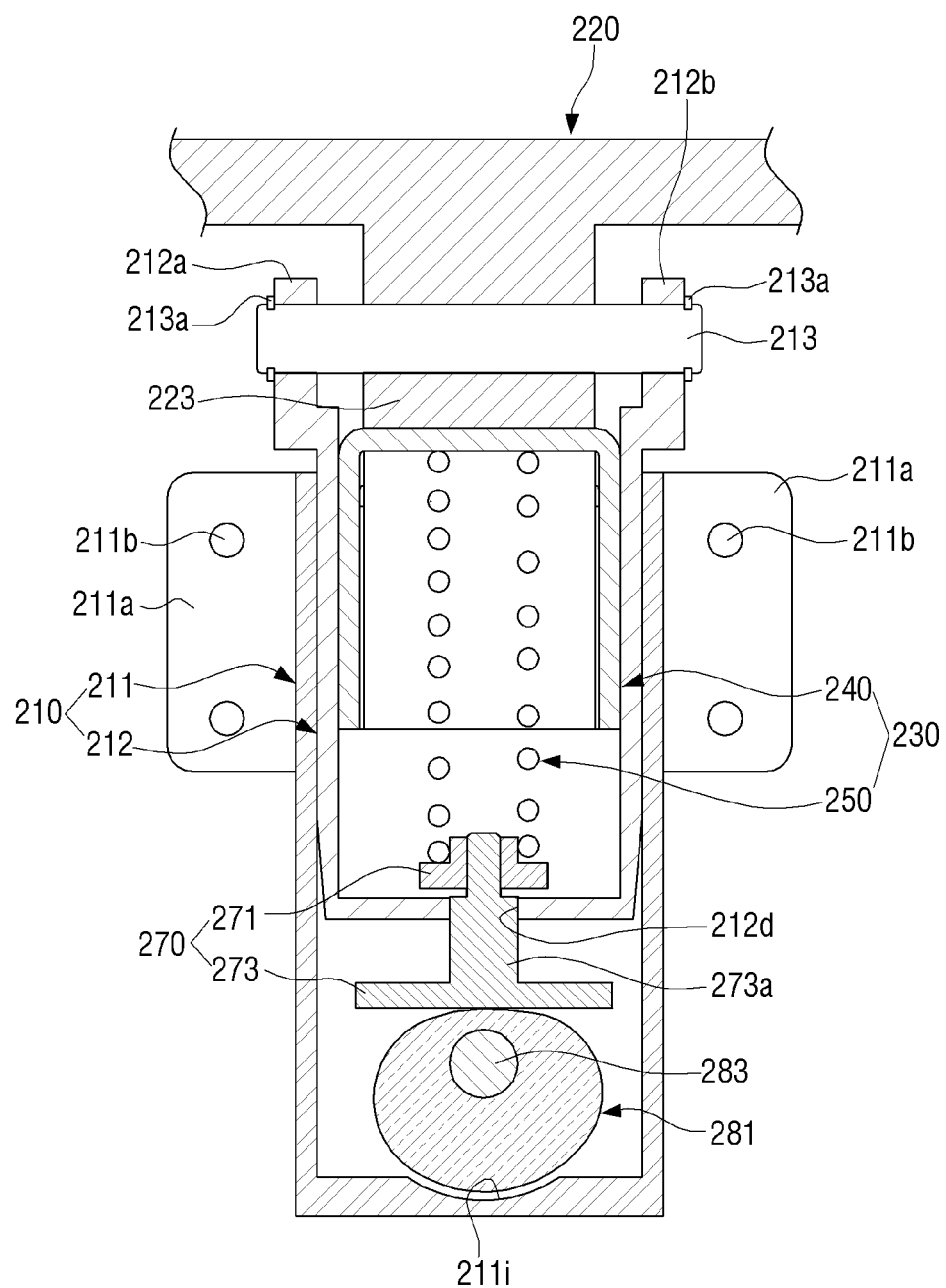
FIG. 16 is a cross-sectional view taken along line IV-IV illustrated in FIG. 13.
Figure 17:
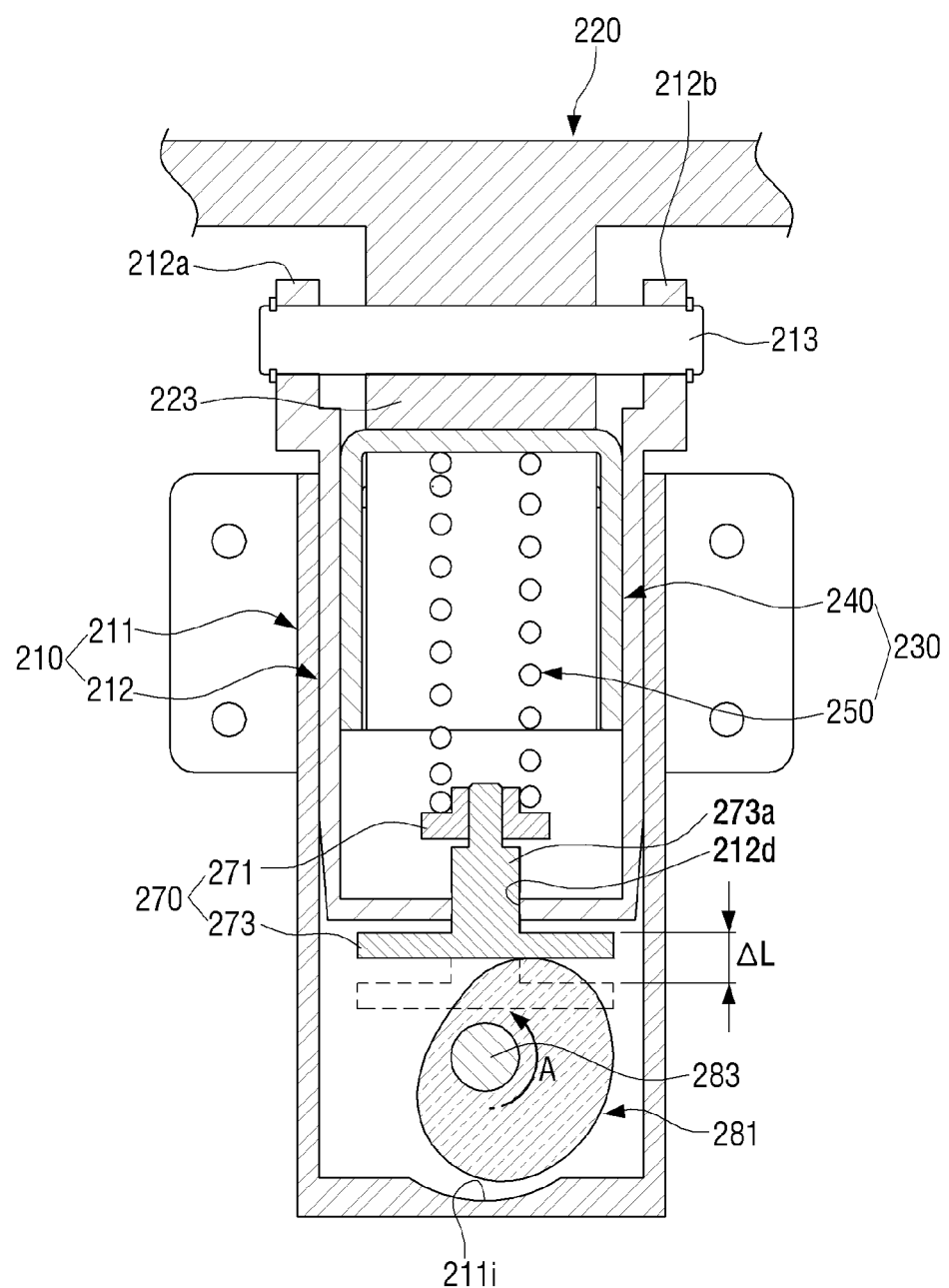
FIG. 17 is a view similar to FIG. 16 to explain a procedure for adjusting a pressing force of a pressing unit using a pressing force adjustment unit.

FIG. 12 is a perspective view of the image forming apparatus according to the second exemplary embodiment. FIG. 13 is a perspective view illustrating the hinge assembly that is applicable to the image forming apparatus illustrated in FIG. 12. FIG. 14 is an exploded perspective view of the hinge assembly illustrated in FIG. 13. FIG. 15 is a cross-sectional view taken along line III-III illustrated in FIG. 13. FIG. 16 is a cross-sectional view taken along line IV-IV illustrated in FIG. 13. FIG. 17 is a view similar to FIG. 16 to explain a procedure for adjusting a pressing force of a pressing unit using a pressing force adjustment unit. The image forming apparatus 1a according to the second embodiment has mostly the similar configurations as the afore-mentioned image forming apparatus 1, but a place where the hinge assembly 200 is located and the configuration of the hinge assembly 200 are somewhat different.

In other words, referring to FIG. 12, a part of an upper side of the image forming apparatus (1a) according to the second embodiment is composed of a separation cover 17.

The separation cover 17 is detachably engaged to an upper side of the image forming apparatus 1a to form a part of the hinge mount hole 15. The separation cover 17 is configured considering that the hinge assembly 200 is fastened to the image forming apparatus 1a using a screw. When adjusting elasticity of the elastic member 250 of the hinge assembly 200, in order to expose a rotation knob 285 which is mounted on the hinge assembly 200 to outside, the separation cover is separated from the main body 10 of the image forming apparatus 1a. Accordingly, a user may adjust elasticity of the elastic member 250 by manipulating the rotation knob 285 while the separation cover 17 is separated from the main body 10.

Referring to FIGS. 13 and 14, the hinge assembly 200 that is applied to the image forming apparatus 1a according to the second embodiment includes a first body 210 mounted on the main body 10 of the image forming apparatus 1a, a second body 220 mounted on the cover unit 20 of image forming apparatus 1a, and a pressing force adjuster to adjust hinge pressure between the first body 210 and the second body 220. In the case of the second exemplary embodiment, the pressing force adjuster may include a pressing unit and an adjustment unit 260.

The first body 210 maintains a state that the first body is inserted in the hinge mount hole (refer to FIG. 2), but unlike the first body 110 of the above-described first embodiment, the first body 210 is fastened to inner side of the main body 10 of the image forming apparatus 1a using a screw 290.

The first body 210 includes a first housing 211 in the shape of a rectangular container and a second housing 212 that is pressedly engaged at inner side of the first housing 211.

In the first housing 211, engagement ribs 211a where a through hole 211b to which the screw 290 is engaged are formed projectedly. The engagement ribs 211a are formed on a side where the first housing 211 is engaged to a part of the main body 10 in a parallel manner.

The first housing 211 has an opening at an upper side so that the second housing 212 can be inserted, and inside the first housing, an accommodation chamber 211c in which a part of an adjustment unit 260 is accommodated along with the second housing 212 is formed. In this case, the adjustment unit 260 is disposed at a lower side of the second housing 212 so as to apply pressure to the elastic member 250 of the pressing unit 230 that is disposed inside the second housing 212.

In the first housing 211, in order to support an end of a rotation axis 283 of the height adjustment member 280, a first support hole 211e is formed on a first side wall 211d of the first housing 211, and a second support hole 211g through which a part of the rotation knob 285 is pivotably engaged to a second side wall 211f which faces the first side wall 211d.

In a bottom portion 211h of the accommodation chamber 211c, an avoidance groove 211i is formed so that a part of a cam member 281 is not interfered by the bottom surface 211h when the rotation cam member 281 of the adjustment unit 260 rotates.

The second housing 212 is inserted to the opening H1 of the first housing 211, and in this case, the second housing may be engaged in a compressed state without a separate screw engagement or may be fastened to the first housing 211 using a predetermined engagement screw. In this case, the second housing 212 forms a taper surface 212c at a lower part of the side portion so that the second housing 212 can be easily inserted to the first housing 211.

This second housing 212 includes a pair of support brackets 212a which are extended upward from an upper portion.

The second body 220 is hinge-connected by the hinge shaft 213 with a pair of the support brackets 212a, and a shaft hole 212b, to which each hinge shaft 213 is inserted, is formed. In this case, two coupler rings 213a are inserted at both ends of the hinge shaft 213 to prevent the hinge shaft 213 is separated from the pair of support brackets 212a.

Inside the second housing 212, the pressing unit 230 is disposed elastically. In this case, the pressing unit 230 presses a part of the second body 220 which is hinge-connected to the hinge shaft 213 and provides hinge pressure between the first body and the second body 210, 220.

The second body 220 is formed in a similar manner as the second body 120 of the first embodiment. In other words, the second body 220 includes a cover engagement portion 121 which fixedly engaged with the cover unit 20 through fastening devices such as screws and a hinge engagement portion 122 hinge-engaged with the pair of support brackets 212a of the first body 210 through the hinge shaft 213. A shaft hole 222a, through which the hinge shaft 213 passes, is formed on the hinge engagement portion 222.

Since the second body 220 is hinge-engaged with the first body 210 using the hinge shaft 213, the second body 120 and the cover unit 20 engaged with the second body 120 are pivotable against the first body 210 around the rotation axis X (refer to FIG. 15) that passes through the center of the hinge shaft 213.

On the second body 220, a cam portion 223 is formed between the cover engagement portion 221 and the hinge engagement portion 222. The cam portion 223 has a curved surface 223a that comes in contact with the pressing unit 230 to receive the pressing force from the pressing unit 230. In accordance with the rotation angle of the cover unit 20, the region of the cam surface 223a that comes in contact with the pressing unit 130 is changed, and thus the level of the pressing force that is provided from the pressing unit 230 is varied in accordance with the rotation angle of the cover unit 20.

As described above, the pressing force adjuster may include the pressing unit 230 and the adjustment unit 260.

The pressing unit 230 includes a pushing member 240 that presses the second body 220 while the curved upper portion 241 is in contact with the second body 220 and an elastic member 250 that provides the pressing force to the pushing member 240. The pressing unit 230 has the same configuration as the pressing unit 130 of the first embodiment, and thus, will not be explained in detail.

The adjustment unit 260 includes an elastic member support plate 270 which supports an end of the elastic member 250, and a part of the adjustment is pivotably accommodated in the first body 210, and the adjustment unit 260 includes a height adjustment member 280 which adjusts height of the elastic member support plate 270 according to rotation.

The elastic member support plate 270 includes a fastening member 271 and an elevation member 273 which elevates the fastening member 271.

The fastening member 271 fixedly supports a lower portion of the elastic member 250, and may strongly support the elastic member 250, as an insertion projection 271a, which is inserted to the elastic member 250, is formed.

The elevation member 273 is slidably inserted to the through hole 212d in which an axis 273a is formed on a bottom of the second housing 212, and the fastening member 271 is engaged with the engagement protrusion 273b that is formed at an upper side of the axis. The elevation member 273 is in plat shape in which a bottom side 273d in contact with the rotation cam member 281 has a predetermined space.

The elevation member 272 presses the elastic member 250 while ascending along with the through hole 212d of the second housing 212 by rotation of the rotation cam member 281 of the height adjustment member 280.

Referring to FIG. 15, the height adjustment member 280 includes the rotation cam member 281, the rotation axis 283, and the rotation knob 285.

In the rotation cam member 281, an engagement hole 281a, through which the rotation axis 283 passes, is formed. In this case, the rotation cam member 281 rotates along with the rotation axis 283 by a first fixing pin 286a. As such, to rotate the rotation cam member 281 along with the rotation axis 283, an end of the first fixing pin 286a is inserted to the insertion groove 281b of the rotation cam member 281, and another end is inserted to the insertion groove 283d of the rotation axis 283, and the rotation cam member 281 and the rotation axis 283 is connected with each other in a fixed state.

As to the rotation cam member 281, length from the engagement hole 281a to an upper end is farther than length from the engagement hole 281a to a lower end, and in an outer circumference of the rotation cam member 281, a cam surface, which may push the elevation member 272 upward while rotating with the rotation axis 283, is formed.

The rotation axis 283 is pivotably inserted inside the first housing 211 of the first body 210, and is disposed roughly orthogonal with respect to a length direction of the first housing 211. An end 283a of the rotation axis 283 is pivotably engaged with the first hinge hole 211e of the second housing 211, and another end 282c, which passes through the hole, is engaged with the rotation knob 285. In this case, the rotation axis 283 is engaged with the rotation knob 285 using a second fixing pin 286b in a fixed state so as to rotate along with the rotation knob 285 while the rotation knob 285 rotates. To do this, the second fixing pin 286b may pass through and be engaged with the through hole 283c which is formed at another end 283b of the rotation axis 283 and the through hole 285b which is formed on the axis 285a of the rotation knob 285 at the same time.

The rotation knob 285 is disposed in a state that the knob is exposed to outside the first housing 211 of the first body 210. This disposition of the rotation knob 285 considers easy access by a user to the rotation knob 285 when the separation cover 17 is separated from the main body 10.

In case of the rotation knob 285, the axis 285a which passes through the second support hole 211g is engaged with the support hole of the first housing 211.

A user, as illustrated in FIG. 16, before the rotation cam member 281 rotates, when the rotation knob 285 is rotated by a predetermined angle in a direction of arrow A as illustrated in FIG. 17, the rotation cam member 281 rotates in a direction of arrow A as much as the rotation angle of the rotation knob 285 along with the rotation axis 283.

The elevation member 273 of the elastic member support plate 270 which is in contact with the cam surface of the rotation cam member 281 further enters toward inside the second housing 212 of the first body 210 by the rotation cam member 281, and accordingly, a fixing member 271 which is engaged with the elevation member 273 is ascended by a predetermined height (ΔL) and is disposed at a higher location. In this case, length of the elastic member 250 which is supported by the fastening member 271 is reduced as much as the width of the ascended elevation member 273, and thus, more compressed state is maintained. The pushing member 140 may provide elastic pressing force to the cover unit 20 by increased elasticity of the elastic member 250.

As described above, according to one or more embodiments, if the cover unit 20 is abruptly closed due to the stiffness weakening of the elastic member 150. 250 that is provided in the hinge assembly 100, 100A, 200, or the pre-stop function of the cover unit 20 is unable to be performed, the compressed length of the elastic member 150, 250 is adjusted through the pressing force adjuster that is provided on the hinge assembly 100, 100A, 200, without the necessity of replacement of the whole hinge assembly, and thus the above-described problems can be easily solved to save the replacement cost of the hinge assembly 100, 100A, 200.

Although a few embodiments have been shown and described, it will be understood by those skilled in the art that various changes in form and detail may be made in these embodiments without departing from the spirit and scope of the present disclosure, as defined by the appended claims and their equivalents.

What is claimed is:

1. An image forming apparatus comprising:
   a main body;
   a cover unit configured to be disposed on an upper side of the main body to press a manuscript; and
   at least one hinge assembly to connect the cover unit to the main body, wherein the hinge assembly includes:
a first body detachably mounted on the main body;
a second body of which a part is fastened to the cover unit and another part is hinge-connected with the first body;
a pressing force adjuster configured to adjust a hinge force between the first body and the second body,
wherein the pressing force adjuster comprises a pressing unit accommodated in the first body to keep applying a pressing force to the second body,
wherein the pressing unit comprises a pushing member configured to press the second body,
wherein the second body has a curved surface-shaped cam surface, and wherein a pushing portion, configured to press the cam surface of the second body, is formed to project from an upper surface of the pushing member, and
wherein a plurality of lubricant supply grooves, which are filled with lubricant, are formed on the pushing portion.

2. The image forming apparatus as claimed in claim 1, wherein the pressing force adjuster further comprises
an adjustment unit configured to adjust a pressing force of the pressing unit that is applied to the second body.

3. The image forming apparatus as claimed in claim 2, wherein the pressing unit further comprises:
an elastic member configured to elastically support the pushing member in the first body,
wherein the adjustment unit adjusts a compressed degree of the elastic member.

4. The image forming apparatus as claimed in claim 3, wherein the adjustment unit comprises:
an elastic member support plate to support an end of the elastic member and elevatably accommodated in the first body; and
a height adjustment member mounted on the first body to adjust a height of the elastic member support plate.

5. The image forming apparatus as claimed in claim 4, wherein the height adjustment member comprises:
a body portion engaged with the elastic member support plate and fastened to the first body; and
a head portion which is integrally formed on the body portion and is exposed outside of the first body.

6. The image forming apparatus as claimed in claim 5, wherein the body portion comprises:
an engagement portion engaged with the elastic member support plate; and
a fastening portion screw-fastened to the first body and having a support plate seating surface to support the elastic member support plate.

7. The image forming apparatus as claimed in claim 4, wherein an insert nut member is mounted on the first body to screw-fasten to the body portion of the height adjustment member.

8. The image forming apparatus as claimed in claim 4, wherein the adjustment unit further comprises a locking nut member engaged with the body portion of the height adjustment member.

9. The image forming apparatus as claimed in claim 4, wherein a height checking opening permits the elastic member support plate to be shown to outside of the first body, and wherein a plurality of height indicating scales, which indicate the height of the elastic member support plate, are formed on the first body.

10. An image forming apparatus comprising:
a main body;
a cover unit configured to be disposed on an upper side of the main body to press a manuscript; and
at least one hinge assembly to connect the cover unit to the main body,
wherein the hinge assembly includes:
a first body detachably mounted on the main body;
a second body of which a part is fastened to the cover unit and another part is hinge-connected with the first body;
a pressing force adjuster configured to adjust a hinge force between the first body and the second body,
wherein the pressing force adjuster comprises:
a pressing unit accommodated in the first body to keep applying a pressing force to the second body; and
an adjustment unit configured to adjust a pressing force of the pressing unit that is applied to the second body,
wherein the pressing unit comprises:
a pushing member configured to press the second body; and
an elastic member configured to elastically support the pushing member in the first body,
wherein the adjustment unit adjusts a compressed degree of the elastic member, and
wherein the adjustment unit is detachably screw-fastened on an outer surface of the first body to support an end of the elastic member.

11. The image forming apparatus as claimed in claim 10, wherein the adjustment unit comprises:
a side portion on which screw threads for screw engagement with the first body are formed along an inner circumferential surface; and
a bottom portion to support the end of the elastic member.

* * * * *